Nov. 2, 1965 K. OBERDORFER 3,214,928
METHOD AND APPARATUS FOR FREEZING FOOD PRODUCTS
Filed March 22, 1963 2 Sheets-Sheet 1

INVENTOR.
KARL OBERDORFER
BY
Browne, Schuyler, & Beveridge
ATTORNEYS.

Nov. 2, 1965     K. OBERDORFER     3,214,928
METHOD AND APPARATUS FOR FREEZING FOOD PRODUCTS
Filed March 22, 1963     2 Sheets-Sheet 2
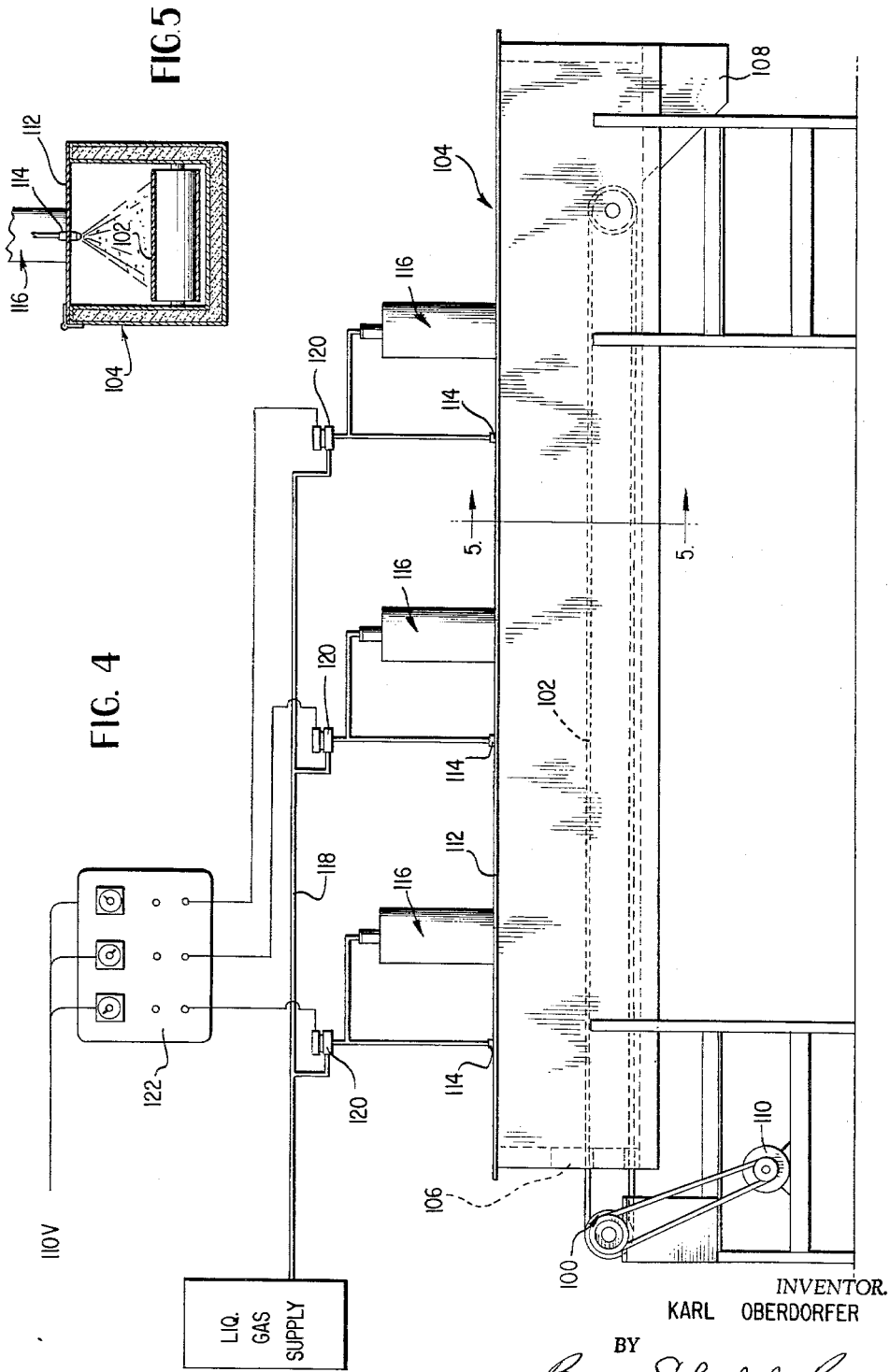
INVENTOR.
KARL OBERDORFER
BY
*Browne, Schuyler, & Beveridge*
ATTORNEYS

United States Patent Office 3,214,928
Patented Nov. 2, 1965

3,214,928
METHOD AND APPARATUS FOR FREEZING
FOOD PRODUCTS
Karl Oberdorfer, 24 Charles St., Council Bluffs, Iowa
Filed Mar. 22, 1963, Ser. No. 267,294
10 Claims. (Cl. 62—63)

The invention relates to methods and apparatus for the freezing of food products, and more particularly to methods and apparatus for quick freezing food products on a production line basis.

It is an object of the present invention to provide a new and improved process for rapidly lowering the temperature of food products in which a stream of incoming products are chilled to the desired temperature during transit through a relatively short freezing zone.

Another object of the invention is to provide a method and apparatus for producing an individually quick frozen product in which each individual piece of food product is separately quick frozen in a fashion such that the pieces do not cluster together during storage.

It is another object of the invention to provide an apparatus of efficient and inexpensive construction for carrying out a process in accordance with the preceding object.

It is another object of the present invention to provide such a process for rapidly freezing food products, which process is equally applicable to products in relatively small particulate form and to products in relatively large form by minor modifications or substitutions in apparatus designed for performing the process.

Still another object of the invention is to provide such a process for the quick freezing of food products in accordance with foregoing objects, which process is readily adaptable to a wide range of product characteristics.

The foregoing, and other objects, are achieved in a process wherein food products to be frozen are conveyed in continuous motion through a zone in which the products are subjected successively to a spray of cryogenic fluid in liquid droplet form and to a shower of such a fluid in the form of "snow." The cryogenic fluid employed in the process will, in the usual case, be carbon dioxide in liquid form. This liquid is sprayed directly upon the food products to be frozen at one location in the path along which the products are conveyed, and is discharged through a snow generator onto the products at a subsequent location in their path of conveyance. Dependent upon the food product characteristics, and desired final temperatures, the food product being frozen may be conveyed past one or more stations, each of which stations is provided with a liquid spray nozzle and a snow generator.

In those cases where the food product being frozen consists of relatively small individual particles, such as corn kernels, peas, etc., a relatively small screw conveyer is preferably employed to convey the food products, thereby achieving a tumbling and mixing action which thoroughly exposes each individual product particle to the action of the liquid spray and snow. In the case of larger articles, such as diced meat, poultry carcasses, etc., a larger screw conveyer or a metallic belt conveyer can be employed as to the conveying apparatus.

Where it is desirable to retain the original form or shape of the product being frozen, such as meat slices or patties, the belt conveyer is preferably employed.

Other objects and features of the invention will become apparent from the following detailed description and the drawings.

In the drawings:

FIG. 4 is a side elevational view of a modified form of apparatus embodying the present invention; and FIG. 5 is a transverse cross-sectional view taken on line 5—5 of FIG. 4.

Figure 1:
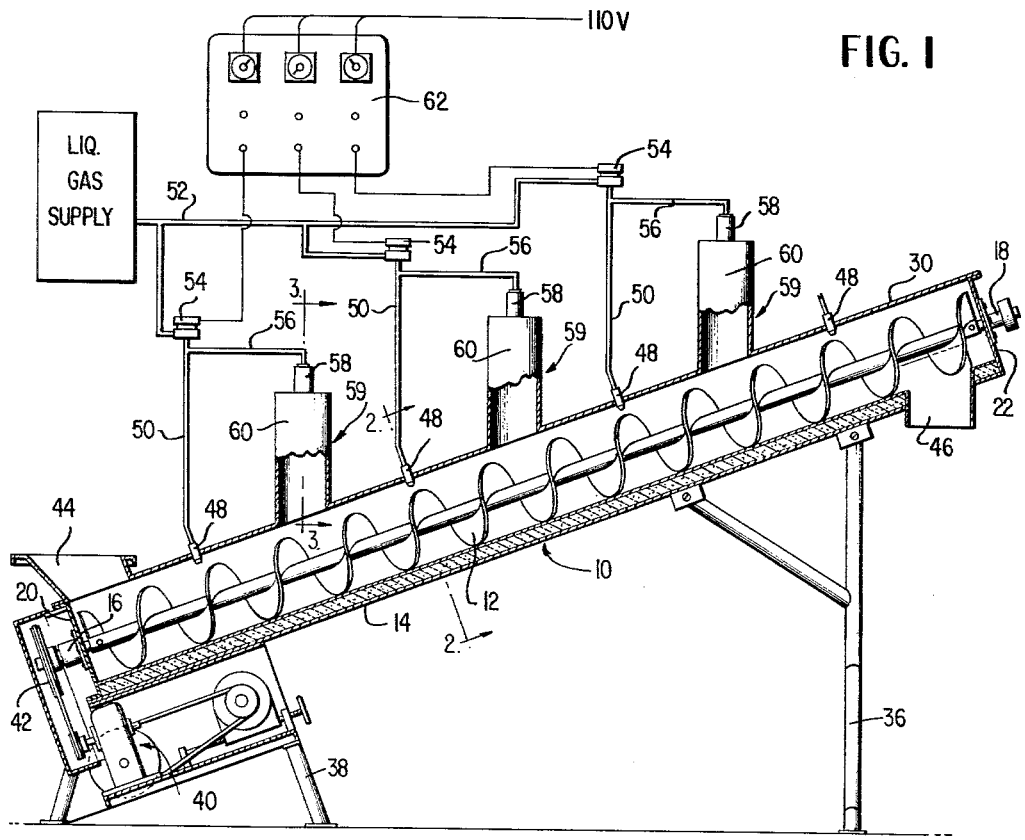
FIG. 1 is a side elevational view, partially schematic and partially in cross-section, showing one form of apparatus embodying the present invention.
Figure 2:
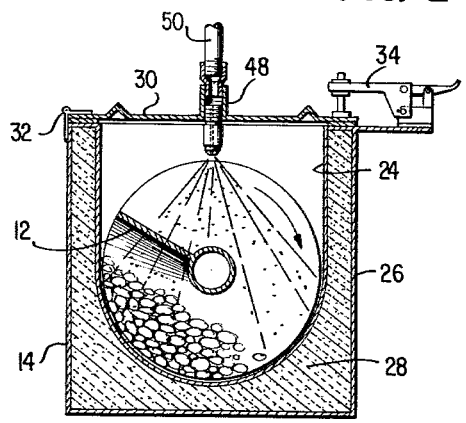
FIG. 2 is an enlarged transverse cross-sectional view taken on line 2—2 of FIG. 1.

Referring first to FIG. 1, one form of apparatus embodying the invention is disclosed as comprising a screw conveyer designated generally 10 which includes a conveying screw 12 supported for rotation within a housing 14 as by nylon bearing assemblies 16 and 18 respectively mounted in housing end plates 20 and 22. As best seen in FIG. 2, the interior wall 24 of housing 14 is of generally U-shaped transverse cross-section, the lower portion of the inner wall 24 being in the form of a circular arc corresponding substantially to the diameter of conveying screw 12. The exterior wall 26 of housing 24 may be of any convenient shape which provides space for a sufficient layer of thermal insulating material 28.

Figure 3:
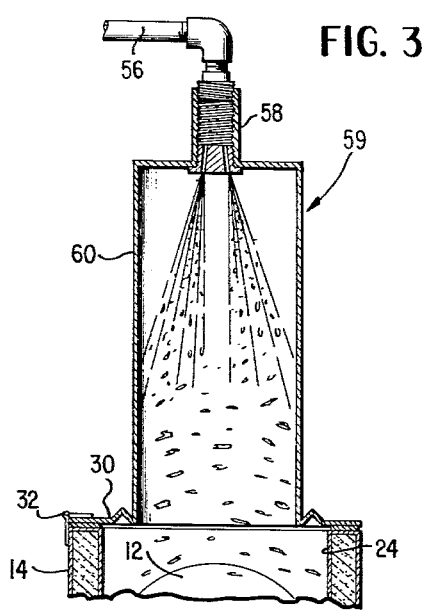
FIG. 3 is an enlarged transverse cross-sectional view taken on line 3—3 of FIG. 1.

The top wall of housing 14 is defined by a cover plate 30 which is hingedly mounted on housing 14 along one edge as at 32, and normally maintained in the closed position indicated in FIG. 2 by suitable latching mechanisms such as that indicated at 34. Because the conveyer assembly of FIGS. 1 through 3 is employed to handle food products, it is necessary to provide convenient access to the interior of the assembly, as by hinged cover plate 30, for purposes of maintaining a suitable degree of sanitation. To prevent products being handled by the apparatus from sticking to metal surfaces of the chamber and screw, the interior surface of interior wall 24 and screw assembly 12 may be coated with a suitable plastic material such as Teflon.

As best seen in FIG. 1, housing 14 is supported, by leg assemblies 36 and 38 for example, so that the rotative axis of screw 12 is inclined upwardly. A suitable drive motor and gear reduction assembly designated generally 40 is mounted upon leg assembly 38 and coupled to screw 12 by any suitable means, such as the drive connection indicated at 42. Housing 14 is formed with an inlet 44 at its lower or left-hand end, as viewed in FIG. 1, through which food products to be frozen are introduced into the chamber defined by the interior of housing 14. An outlet 46 at the right-hand of housing 14, as viewed in FIG. 1, forms a discharge opening through which products are discharged after they have been conveyed through the interior of housing 14 by rotation of screw 12. Outlet 46 may be associated with further food handling or packaging apparatus as desired.

A plurality of spray nozzles 48 are mounted at longitudinally spaced positions along the longitudinal center line of cover plate 30 and trained in a direction such that fluid discharged from nozzles 48 is sprayed over substantially the entire width of the interior of housing 14 at each nozzle location. Each of nozzles 48 is connected by means of a branch conduit 50 to a main supply manifold 52 through a solenoid operated valve 54. Manifold 52 is connected to a supply of liquefied gas under pressure, the liquefied gas usually being liquid carbon dioxide.

A second branch conduit 56 is connected to branch conduit 50 below the associated valve 54 and terminates at a nozzle 58. Each of nozzles 58 is mounted in an expansion chamber 60, each chamber 60 being mounted upon cover plate 30 as best seen in FIG. 3 so that each nozzle 58 is spaced a substantial distance above the interior of housing 14. Nozzles 58 are so constructed that liquified gas discharged from the nozzles is diffused and solidified into flakes by contacting the interior walls of chambers 60. The flake-like products so formed are generally referred to as "snow" and the over-all combination of nozzles 58 and chamber 60 is commonly referred to as a snow generator, designated generally by reference numeral 59, when employed with a liquified gas such as carbon dioxide.

Valves 54 may take the form of any of several commercially available solenoid actuated two-way valves, the function of valve 54 being to connect or disconnect the respective nozzles from the liquified gas supply manifold 52. An electrical control panel for controlling operation of the various valves 54 is schematically indicated at 62.

*Operation*

In operation, drive motor assembly 40 is energized to drive screw 12 in rotation in a direction which will convey food products upwardly through the interior of housng 14. Food products to be frozen are introduced into the apparatus through inlet opening 44 and are driven by the screw through the interior of housing 14 toward outlet opening 46. One or more of valves 54 are opened to place the associated liquid spray nozzles 48 and snow generators 59 in communication with the supply of liquified gas. As the products enter the interior of housing 14 and are driven by screw 12, the products first pass beneath a spray of cryogenic liquid discharged from liquid spray nozzle 48. The liquid gas droplets immediately crust each individual food product piece, and the screw, in conveying the products, also imparts a tumbling action to them so that a maximum direct exposure of each individual particle to the liquid spray is achieved. The immediate crusting of the products by the liquid gas droplets prevents dehydration and immediately lowers the temperature of the product, thereby preventing the individual product particles from adhering to one another.

As the products are advanced upwardly beyond the first liquid spray nozzle 48, they pass beneath snow generator 59 and are showered with snow flakes which become thoroughly intermixed with the food product particles to further lower the temperature of the particles. Dependent upon the product characteristics, the temperature of the products as they are introduced into the inlet, and the desired final temperature of the products, one or more of the valves 54 may be opened to actuate one or more of the desired liquid spray-snow generator combinations. The speed of the screw 12 likewise may be varied in accordance with the characteristics of the particular product being frozen.

By including the screw and its associated tunnel in the manner shown in FIG. 1, the gas produced by the evaporation of the liquified gas droplets, being heavier than air in the case of carbon dioxide for example, tends to flow toward the lowest point of the tunnel, thereby subjecting the incoming products to a concentrated amount of gas at low temperature to achieve a rapid reduction in temperature of the entering products.

Employment of carbon dioxide from the liquified gas enables, by chemical reaction resulting from the flushing of the product with carbon dioxide, the reduction or arrest of bacterial growth on the food product. In the usual case, a small amount of gaseous vapor remains with the product as it is discharged through discharge outlet 46, thus enabling a gas packed product package to be achieved merely by discharging the frozen food product through outlet 46 into a plastic bag or other gastight enclosure.

The embodiment of FIG. 1 is especially adapted for the chilling or freezing of food products in those cases where the food products are in the form of granular or relatively small particulate objects. Examples of food products of the type which the apparatus of FIG. 1 is designed to handle are corn kernels, peas, diced carrots, etc. In products of this type, the gentle tumbling action imparted to the products by the screw conveyer assures a thorough exposure of the products to the liquid spray, and a complete intermixing of snow particles throughout the mass of food products.

*Embodiment of FIG. 4*

The modified form of apparatus shown in FIG. 4 has particular utility for freezing food products which cannot be handled as conveniently by the screw conveyer apparatus of FIG. 1.

Referring to FIG. 4, a belt conveyer assembly designated generally 100 is mounted in a suitable manner with the major portion of its belt 102 located within a chamber defined by the interior of a thermally insulated housing designated generally 104. A food product inlet 106 is provided at one end of housing 104, while a food product outlet 108 is located at the opposite end of the housing. Conveyer 100 is driven by any suitable means, such as a drive assembly 110 coupled to belt 102 externally of housing 104 to drive belt 102 in a direction such that its upper run moves through housing 104 from left to right as viewed in FIG. 4—i.e., from inlet 106 toward outlet 108. Belt 102 is of metallic construction, preferably of flexible stainless steel sheet material.

Housing 104 is constructed with a hinged cover plate 112 generally similar to cover plate 30 of the FIG. 1 embodiment. A plurality of spray nozzles 114 and snow generators 116 of construction identical to those of nozzles 48 and snow generator 59 of the FIG. 1 embodiment are mounted at longitudinally spaced locations along the longitudinal center line of cover plate 112. As was the case of the FIG. 1 embodiment, each associated set of spray nozzle 114 and snow generator 116 is connected to a liquified gas supply manifold 118 through a conduit controlled by a solenoid actuated two-way valve 120 of construction identical to the solenoid actuated valves 54 of the FIG. 1 embodiment. Supply manifold 118 is connected to a supply of cryogenic fluid, such as liquid carbon dioxide, the liquified gas being conducted from the supply to spray nozzles 114 and snow generators 116 when the associated valves 120 are in their open position. As in the previous case, valves 120 are controlled from an electric control panel 122.

The operation of the FIG. 4 embodiment is believed apparent from the above description of the operation of the FIG. 1 embodiment. Products to be frozen are placed on belt 102 in front of inlet 106 and are carried by the belt into housing 104 to pass beneath a spray nozzle 114 which sprays the product with liquified gas in liquid droplet form to encrust the product. Subsequently, the products pass beneath a snow generator 116 which showers the product with snow. The steel conveyor belt 102 is steadily exposed to the low temperatures of the spray and snow and will, within a short time of pre-cooling the apparatus, reach a temperature of minus 30° F. or lower. As a direct contact is made with the products carried by the belt, a continuous plate freezing action is obtained. To prevent products being handled by the apparatus from sticking to metal surfaces on the belt, the belt 102 may be coated with a suitable plastic material such as Teflon. Although the upper run of belt 102 is illustrated as being horizontal, it may be inclined if desired.

As employed in the specification and following claims, the term "cryogenic fluid" refers to carbon dioxide, nitrogen and other fluids having relatively low boiling points, comparable to carbon dioxide. The term "snow" refers to the crystalline, flake-like particles formed by the rapid evaporation of a cyrogenic fluid from its liquid form.

While exemplary embodiments of the invention have been disclosed, it will be apparent to those skilled in the art that the disclosed embodiments may be modified. Therefore, the foregoing description is to be considered exemplary rather than limiting, and the true scope of the invention is that defined in the following claims.

I claim:

1. The method of quick freezing food products comprising the steps of conveying food products to be frozen along a path extending through a thermally insulated chamber, discharging a spray of cyrogenic fluid in liquid droplet form into said chamber to contact the food products as said products are conveyed past a first location on said path, and discharging a shower of carbon dioxide in the form of snow into said chamber to fall upon said food products as said products pass a second location on said path subsequent to said first location.

2. The method of quick freezing food products comprising the steps of conveying food products to be frozen along an upwardly inclined path through a thermally insulated chamber, uniformly exposing the products while in said chamber to an initial spray of cyrogenic fluid in liquid droplet form, said cyrogenic fluid being of the type that readily evaporates into a gas heavier than air uniformly exposing the products while in said chamber to a subsequent shower of cyrogenic fluid in snow form, and trapping the gas vapors formed by the cyrogenic fluid at the inlet side of said chamber to perform an initial cooling operation on the incoming products.

3. The method of quick freezing food products according to claim 2 wherein the products are uniformly exposed to the cyrogenic fluid by tumbling the products as they are conveyed through said chamber.

4. Apparatus for freezing food products comprising means defining a thermally insulated chamber having a food product inlet and a food product outlet, means for conveying food products along an upwardly inclined fixed path from said inlet to said outlet, a source of cyrogenic fluid, first nozzle means in said chamber at a location adjacent said inlet operable when connected to said source to discharge a spray of cyrogenic fluid in liquid droplet form into said chamber, and second nozzle means in said chamber at a location between said first nozzle means and said outlet operable when connected to said source to discharge cyrogenic fluid from said source in the form of snow onto the food products as they are conveyed along said path by said conveying means.

5. Apparatus for freezing food products according to claim 4 wherein said conveying means includes means for tumbling the products to uniformly expose them to said discharges of cyrogenic fluid.

6. The method of quick freezing food products comprising the steps of conveying food products to be frozen along a path extending through a thermally-insulated chamber, discharging sprays of cyrogenic fluid in liquid droplet form from a pre-selected number of a plurality of inlets spaced along said path into said chamber upon food products being conveyed along said path, discharging a shower of snow into said chamber on said products from a pre-selected number of a plurality of inlets located respectively between said first mentioned plurality of inlets, and regulating the discharge from said inlets in accordance with the type of products to be frozen and the ultimate freezing temperature of the products to be obtained.

7. Apparatus for freezing food products comprising in combination; means defining a thermally-insulated chamber having a food product inlet and a food product outlet spaced from said inlet, means in said chamber for conveying food products along a path from said inlet to said outlet, a plurality of nozzles in said chamber spaced along said path for discharging a spray of cryogenic fluid in liquid droplet form on the products being conveyed, a plurality of snow generators including nozzles located in said chamber between said first mentioned nozzles respectively for discharging cryogenic fluid in the form of snow onto the food products being conveyed, a source of cryogenic fluid, conduit means interconnecting said source and said nozzles, and means including valves in said conduit means for selectively controlling the discharge from said nozzles.

8. The method of quick freezing food products comprising the steps of conveying food products to be frozen along an upwardly inclined path extending through a thermally-insulated chamber, discharging a spray of cyrogenic fluid in liquid droplet form into said chamber to contact the food products as said food products are conveyed past a first location on said path, and discharging a shower of carbon dioxide snow into said chamber to fall upon said products as said products pass a second location situated above said first location on said path.

9. The method of quick freezing food products comprising the steps of conveying food products to be frozen along an upwardly inclined path through a thermally-insulated chamber, uniformly exposing the products while in said chamber to an initial spray of liquid carbon dioxide and subsequently to a shower of carbon dioxide snow, and trapping gas vapors formed from the carbon dioxide at the inlet side of said chamber to perform an initial cooling operation on the incoming products.

10. The method of quick freezing food products comprising the steps of conveying food products to be frozen along a path extending through a thermally-insulated chamber, discharging sprays of liquid carbon dioxide from a preselected number of a plurality of inlets spaced along said path into said chamber upon food products being conveyed along said path, discharging a shower of carbon dioxide snow into said chamber on said products from a preselected number of a plurality of inlets located respectively between said first mentioned plurality of inlets and regulating the discharge from said inlets in accordance with the type of products to be frozen and the ultimate freezing temperature to be obtained.

References Cited by the Examiner

UNITED STATES PATENTS

| | | | |
|---|---|---|---|
| 1,922,795 | 8/33 | De Rome | 62—374 X |
| 1,933,257 | 10/33 | Gossmann | 62—388 |
| 2,153,742 | 4/39 | Conn | 62—374 |
| 2,469,979 | 5/49 | Munson | 62—62 |
| 2,879,005 | 3/59 | Jarvis. | |
| 2,893,216 | 7/59 | Seefeldt | 62—63 |
| 3,039,276 | 6/62 | Morrison | 62—64 |

EDWARD J. MICHAEL, *Primary Examiner.*